United States Patent [19]

Blades et al.

[11] Patent Number: 5,990,888
[45] Date of Patent: Nov. 23, 1999

[54] METHOD AND SYSTEM FOR MANIPULATING GRAPHICAL OBJECTS

[75] Inventors: Jerry Allen Blades; Harvey Gene Kiel, both of Rochester; Raymond Francis Romon, Oronoco, all of Minn.

[73] Assignee: International Business Machines Corporation, Armonk, N.Y.

[21] Appl. No.: 08/216,735

[22] Filed: Mar. 22, 1994

[51] Int. Cl.[6] .................................................. G06F 3/14
[52] U.S. Cl. ......................................... 345/339; 345/334
[58] Field of Search ..................................... 395/155, 161, 395/133, 140, 146, 147; 364/401; 345/140, 145, 339, 348, 334, 326, 433, 440

[56] References Cited

U.S. PATENT DOCUMENTS

| | | | |
|---|---|---|---|
| 4,674,042 | 6/1987 | Hernandez et al. | 364/401 |
| 4,674,043 | 6/1987 | Hernandez et al. | 364/401 |
| 4,870,397 | 9/1989 | Soto et al. . | |
| 4,974,194 | 11/1990 | Barker et al. . | |
| 5,226,118 | 7/1993 | Baker et al. | 395/161 |
| 5,414,809 | 5/1995 | Hogan et al. | 395/155 |
| 5,437,008 | 7/1995 | Gay et al. | 395/161 |

FOREIGN PATENT DOCUMENTS

WO 92/12488   7/1992   WIPO .

OTHER PUBLICATIONS

"Interactive Variable Control During Visualization of Mathematical Functions" IBM Technical Disclosure Bulletin, vol. 34, No. 9, pp. 288–289, Feb. 1992.

Microsoft Excel User's Guide 1 Table of Contents, Version 4.0, First Addition, 1992.

Microsoft Excel User's Guide 2, Table of Contents, Version 4.0, First Addition, 1992.

Microsoft Excel User's Guide 2, Chapter 3, Version 4.0, First Addition, 1992.

Primary Examiner—Crescelle N. dela Torre
Attorney, Agent, or Firm—Andrew J. Dillon

[57] ABSTRACT

A data processing system for efficiently manipulating a graphic object displayed within a graphic user interface in the data processing system. The graphic object is defined by interrelated variables. Under the present invention, interrelated variables defining the graphic object are associated with at least one data structure, wherein the each data structure includes a value for at least one of the interrelated variables. An editing object is displayed within the graphic user interface in response to a selection of the graphic object by a user. The user is permitted to alter a value for one of the interrelated variables utilizing the editing object. A value for at least one other variable is automatically altered in response to the user altering the value for one of the interrelated variables utilizing the editing object. A display of the graphic object automatically altered in response to an alteration of the value for the at least one other variable, wherein the graphic object is efficiently manipulated.

20 Claims, 15 Drawing Sheets

METHOD AND SYSTEM FOR MANIPULATING GRAPHICAL OBJECTS

BACKGROUND OF THE INVENTION

1. Technical Field

The present invention relates in general to an improved data processing system and in particular to an improved method and system for manipulating graphic objects. Still more particularly, the present invention relates to an improved method and system for manipulating graphic objects and updating data structures.

2. Description of the Related Art

Data may be manipulated in many ways in a modern state-of-the-art data processing system including: data accessing, data encoding, data communications, data compression, data conversion, data entry, data exchange, data filing, data linking, data locking, data manipulation, data mapping, data modeling, etc. The large amounts of data that are available to the user of a modern state-of-the-art data processing system often become overwhelming in magnitude and complexity. These situations often may arise in the creation and execution of documents in a graphic user interface (GUI) employing windows.

Data processing systems are capable of communicating information to users in many formats, such as text, graphics, and sounds. Many times a user will create a graph to present information from various sources, such as spread sheets, word processing documents, and data bases to provide a coherent and comprehensive presentation to the user. A graph may be represented by a number of different components. For example, a bar in a bar graph may be represented by a single value or by an equation defined by two or more variables. In some cases, a user may desire to edit or alter the graph to determine how changes in different components of the graph will affect other components. Presently, a user must change or alter values for the various variables at the data structure containing the values for the variable the user desires to change by utilizing another program such as a spread sheet program or a database manages to change the values. As a result, a user often has to perform a number of complicated manipulations in order to change the graph. Such manipulations may become cumbersome and confusing when a large number of variables make up a graph.

Therefore it would be advantageous to have a method and system for providing a user an efficient way to manipulate a graph that is defined by a number of different variables.

SUMMARY OF THE INVENTION

It is therefore one object of the present invention to provide an improved data processing system.

It is another object of the present invention to provide an improved method and system for manipulating graphic objects.

It is yet another object of the present invention to provide an improved method and system for manipulating graphic objects and updating data structures.

The foregoing objects are achieved as is now described. The present invention provides a data processing system for efficiently manipulating a graphic object displayed within a graphic user interface in the data processing system. The graphic object is defined by interrelated variables. Under the present invention, interrelated variables defining the graphic object are associated with at least one data structure, wherein the each data structure includes a value for at least one of the interrelated variables. An editing object is displayed within the graphic user interface in response to a selection of the graphic object by a user. The user is permitted to alter a value for one of the interrelated variables utilizing the editing object. A value for at least one other variable is automatically altered in response to the user altering the value for one of the interrelated variables utilizing the editing object. A display of the graphic object is then altered in response to an alteration of the value for the other variable, wherein the graphic object is efficiently manipulated.

In addition, the present invention also may automatically update data structures for variables having an altered value in response to the said alteration of the said value for the at least one other variable.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 3A–3G depict for a graphic user interface including an edit window in accordance with a preferred embodiment of the present invention;

DETAILED DESCRIPTION OF PREFERRED EMBODIMENT

Figure 1:
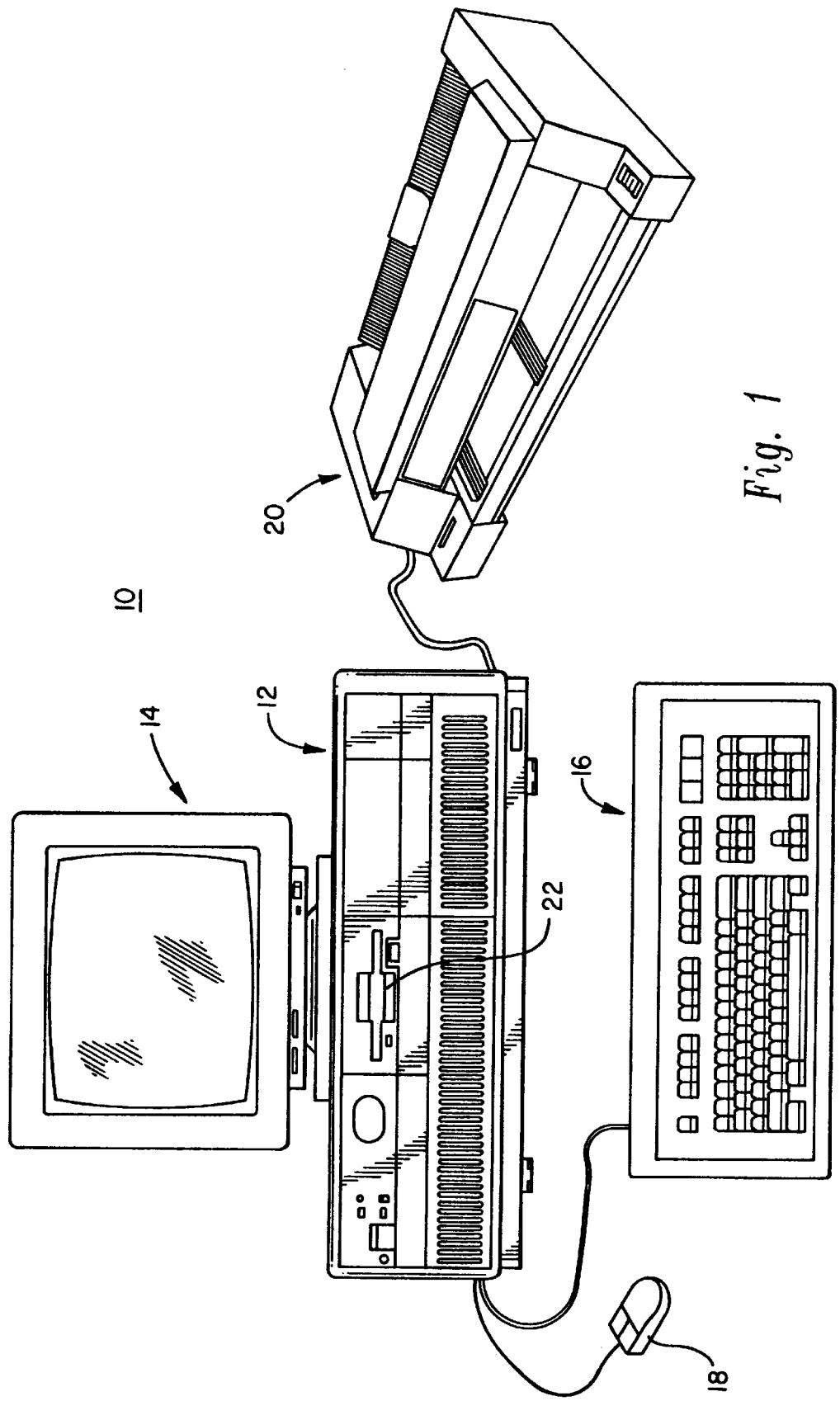
FIG. 1 depicts a pictorial representation of a data processing system in which a preferred embodiment of the present invention may be employed.

Referring now to the figures, and in particular to FIG. 1, there is shown a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, or local area networking interfaces. Additionally, input/output (I/O) devices, such as diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 2:
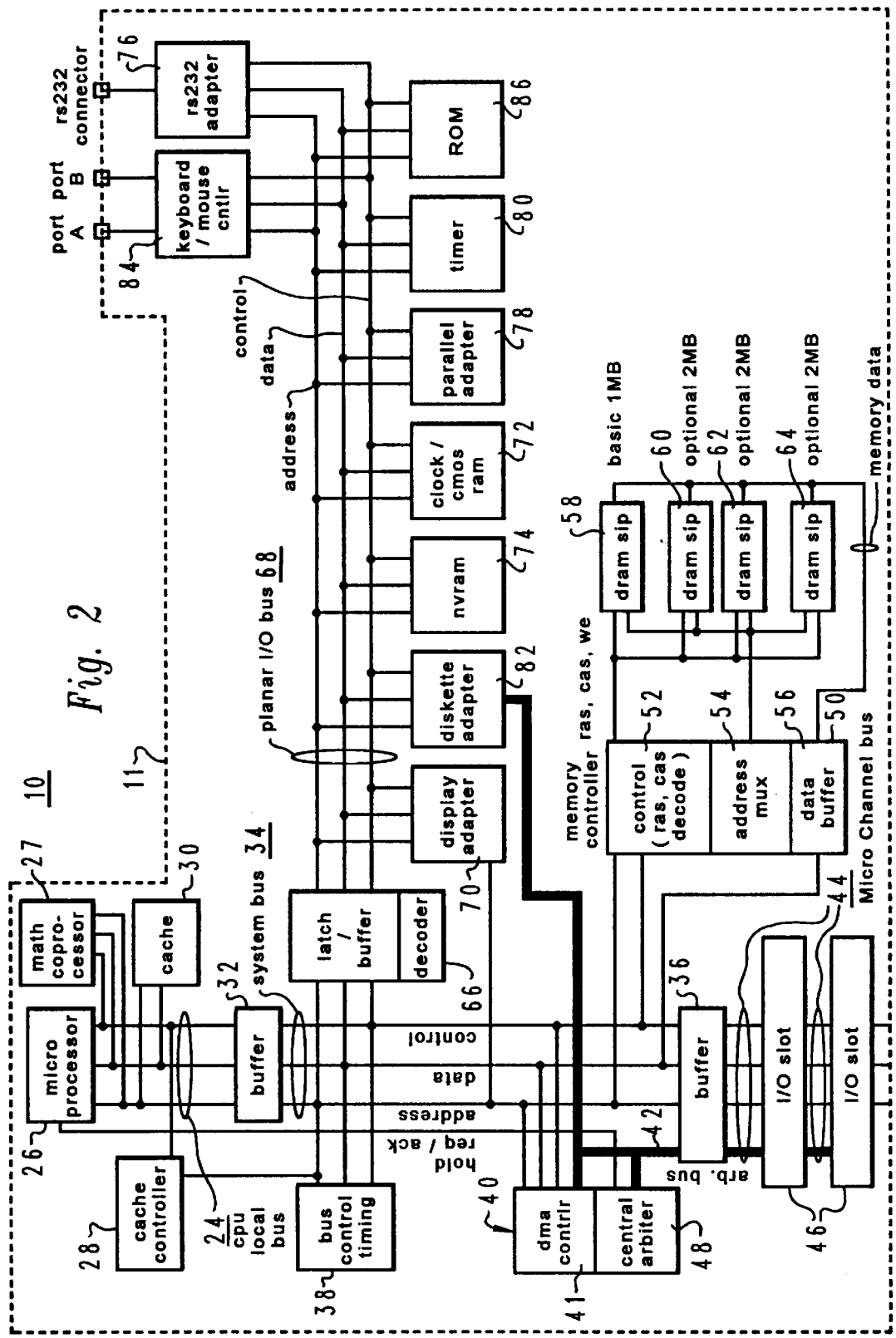
FIG. 2 is a block diagram of the data processing system depicted in FIG. 1 in accordance with a preferred embodiment of the present invention.

Prior to relating the above structure to the present invention, a summary of the operation in general of personal computer system 10 may merit review. Referring to FIG. 2, there is shown a block diagram of personal computer system 10 illustrating the various components of personal computer system 10 in accordance with the present invention. FIG. 2 further illustrates components of planar 11 and the connection of planar 11 to the I/O slots 46 and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the 80386 which is sold by Intel.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80286, 80486, or Pentium microprocessor. "Pentium" is a trademark of Intel Corporation. These particular microprocessors can operate in a real addressing mode or a protected addressing mode. Each mode provides an addressing scheme for accessing different areas of the microprocessor's memory.

Returning now to FIG. 2, CPU local bus 24 (comprising data, address and control components) provides for the connection of CPU 26, an optional math compressor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36. System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and an optional feature bus such as the Micro Channel bus 44. "Micro Channel" is a registered trademark of International Business Machines Corporation. Connected to bus 44 are a plurality of I/O slots 46 for receiving Micro Channel adapter cards which may be further connected to an I/O device or memory. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexer 54, and a data buffer 56. Memory control unit 50 is further connected to a random access memory as represented by RAM module 58. Memory controller 52 includes the logic for mapping addresses to and from CPU 26 to particular areas of RAM 58. While the microcomputer system 10 is shown with a basic 1 megabyte RAM module, it is understood that additional memory can be interconnected as represented in FIG. 2 by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector.

An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

Figure 3A:
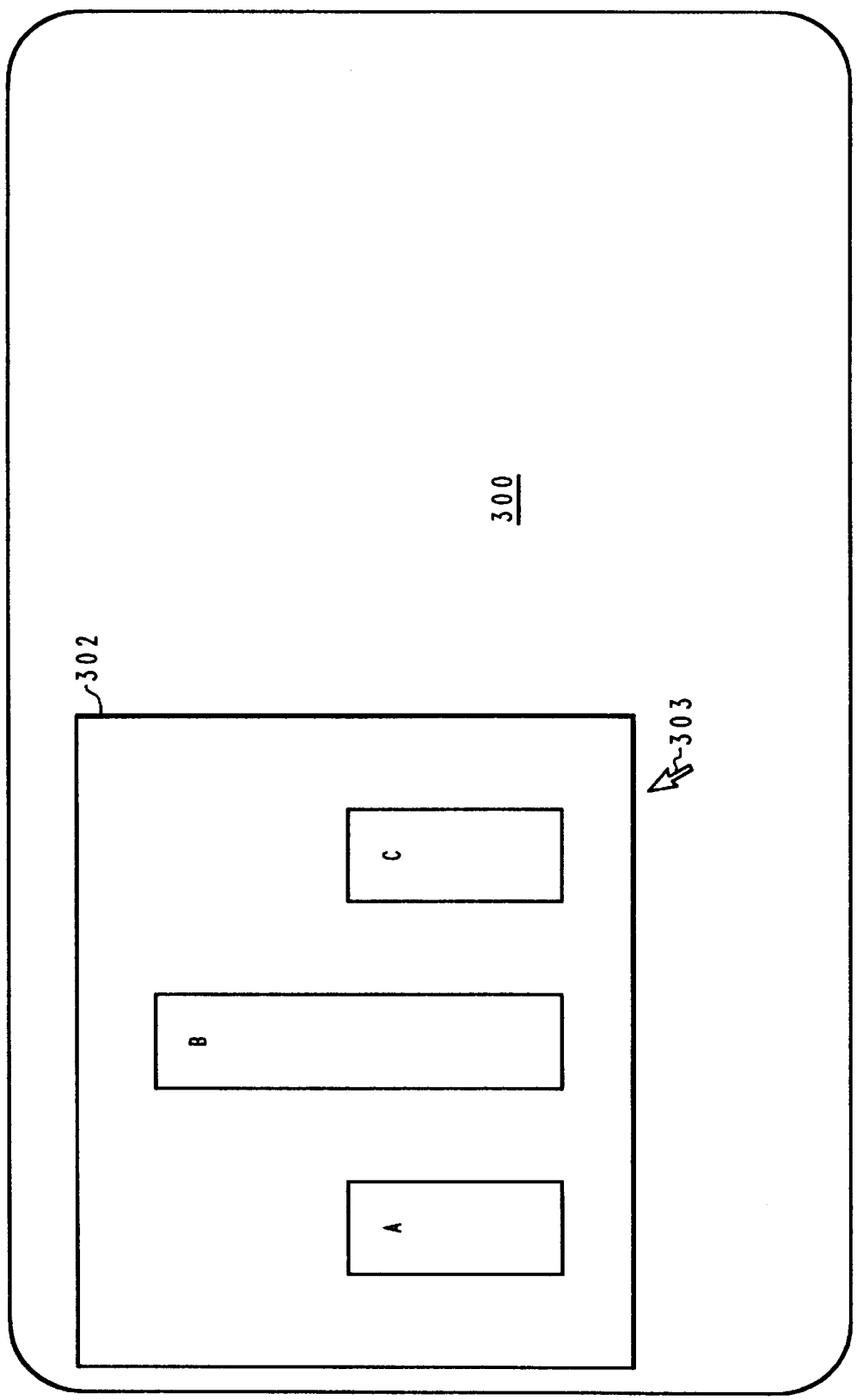

Referring now to FIG. 3A, GUI 300 includes window 302, which contains a bar graph including bars A, B, and C. Pointer 303 may be utilized to select a bar. A "pointer" is a visible cue that is provided for the pointing device to show where interaction may occur. The visible cue is typically an iconic image, such as an arrow, displayed on the video display device of the data processing system to indicate to the user icons, menus, or the like that may be selected or manipulated. Pointing devices may include, but are not limited to a mouse; track ball; light pen; touch screen; and the like. A pointing device is typically employed by a user of a data processing system to control a pointer when interacting with the data processing system's graphic user interface (GUI).

Figure 3B:
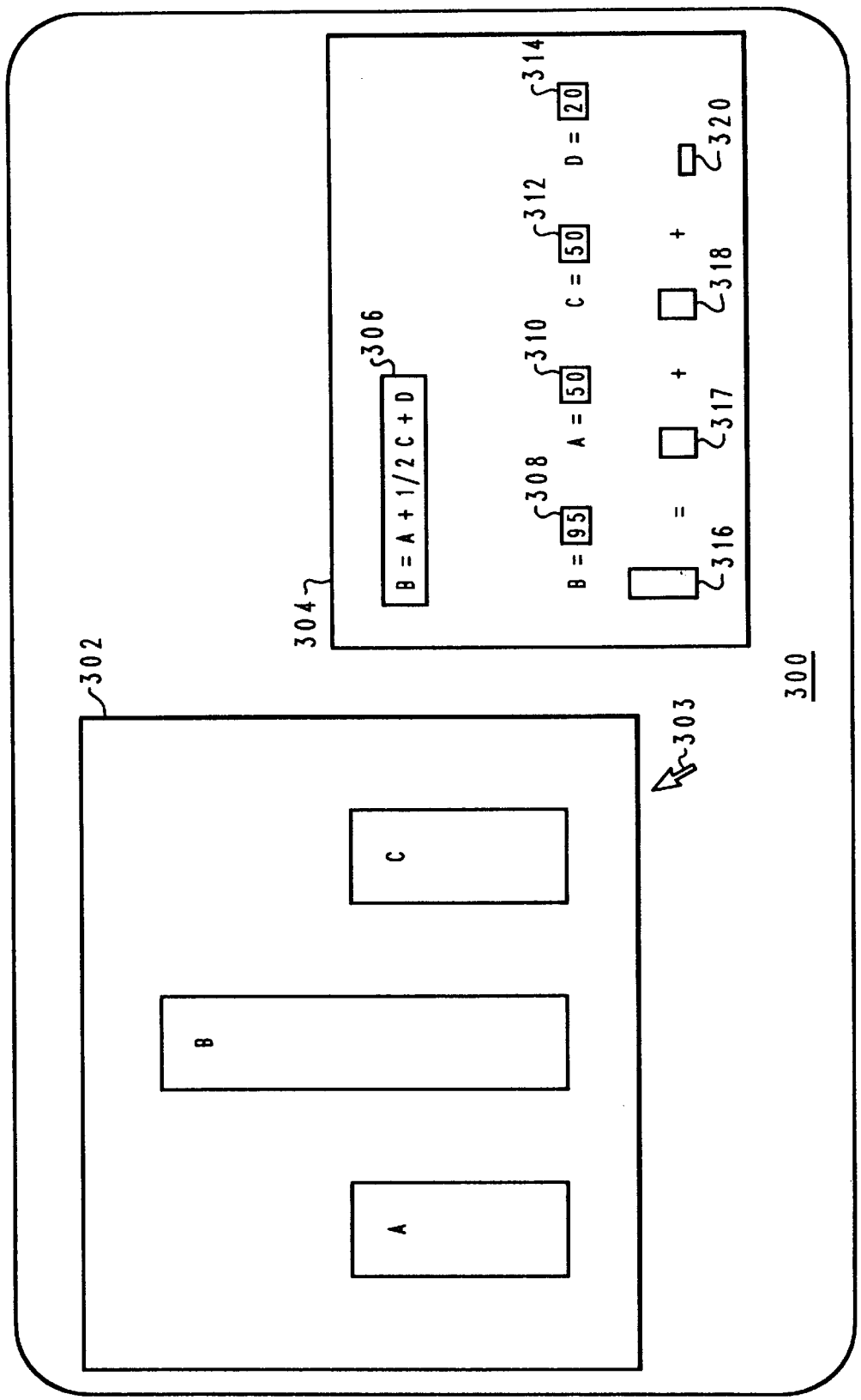

For example, selection of bar B results in edit window 304 being displayed within GUI 300, as depicted in FIG. 3B. Edit window 304 contains an equation in region 306 also referred to as an "equation box". Values for variables A, B, C, and D may be altered by the user by selecting variable regions 308, 310, 312, and 314, respectively. Alternatively, values for the variables may be changed by selecting graphic objects, such as, bars 316, 317, 318, and 320 in accordance with a preferred embodiment of the present invention.

Figure 3C:
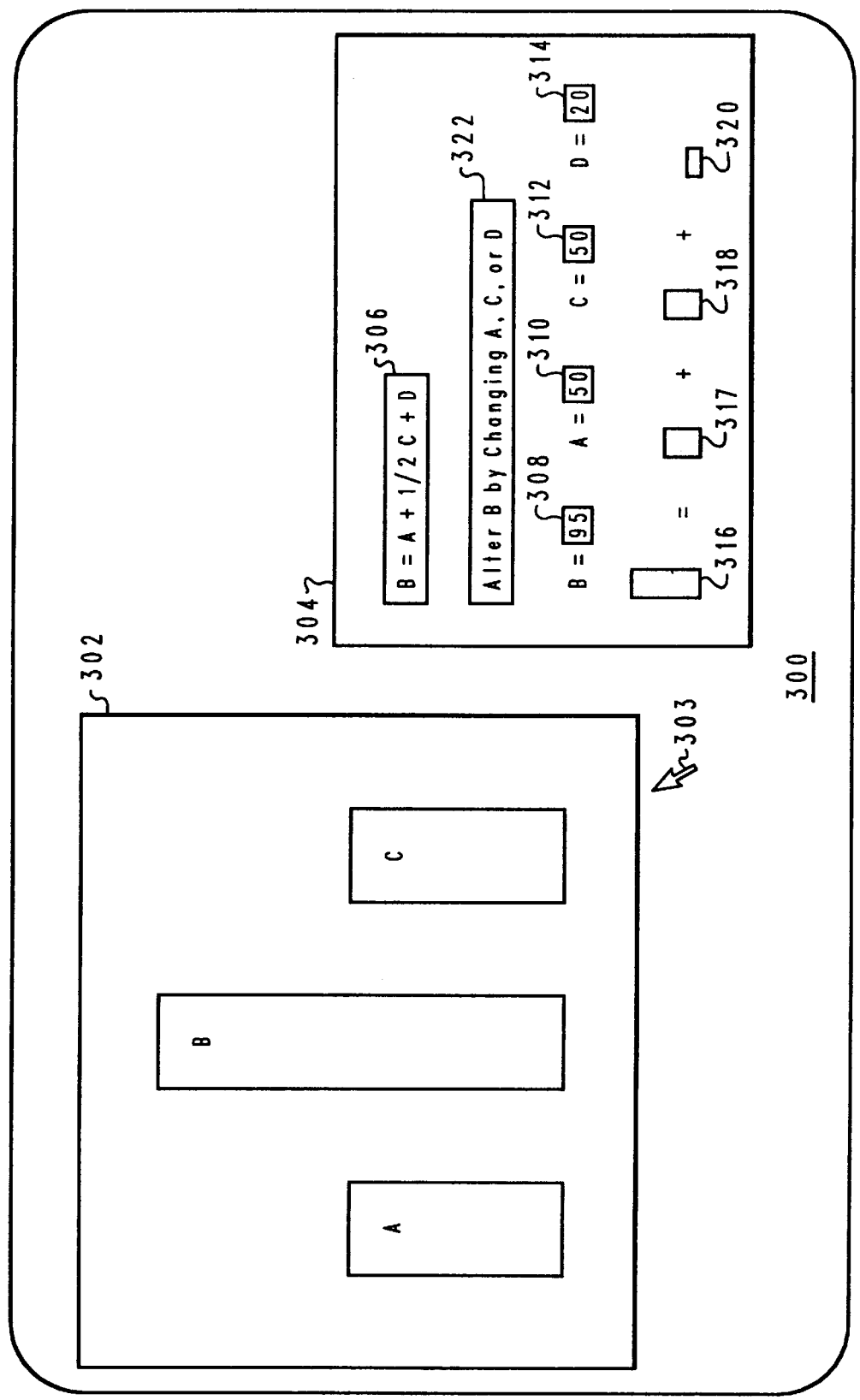
Figure 3D:
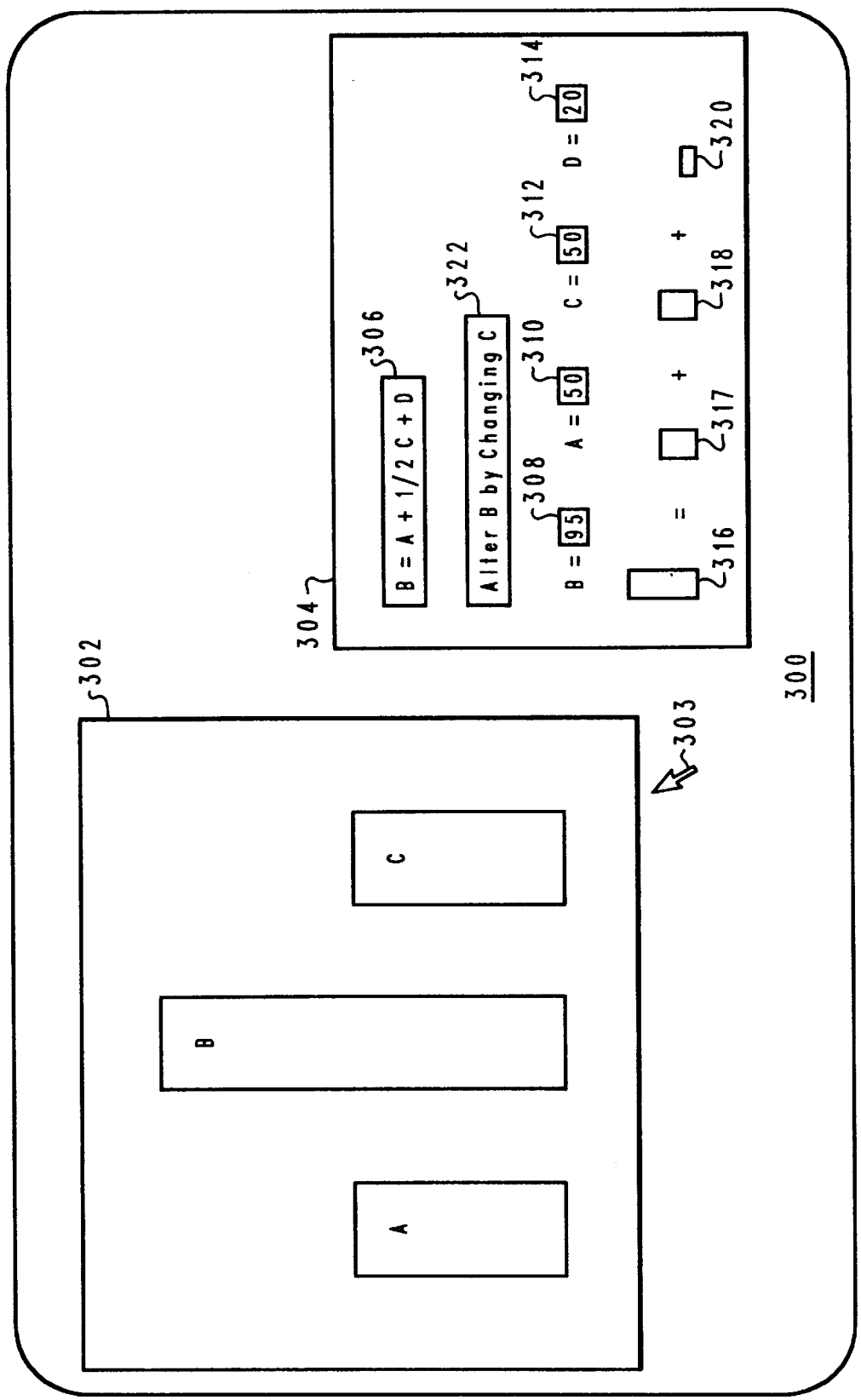

Referring now to FIG. 3C, selection of variable regions 310, 312, 314, or bars 317, 318, or 320 results in text field 322 being displayed to the user. In this example, the text reads "Alter B by Changing A, C, or D". If the user chooses variable field 308 or bar 316, text field 322 displays "Alter B by Changing C", as illustrated in FIG. 3D. The values for the variables may be altered by entering new values into the variable fields. The altering of variable B by changing variable C is only an example. Of course, other variables may be altered such as A or D in the depicted example.

Alternatively, the user may select one of the bars in edit window 304 and alter the bar to change the value for the variable associated with the particular bar. These changes would be reflected in the appropriate variable fields and bars.

Figure 3E:
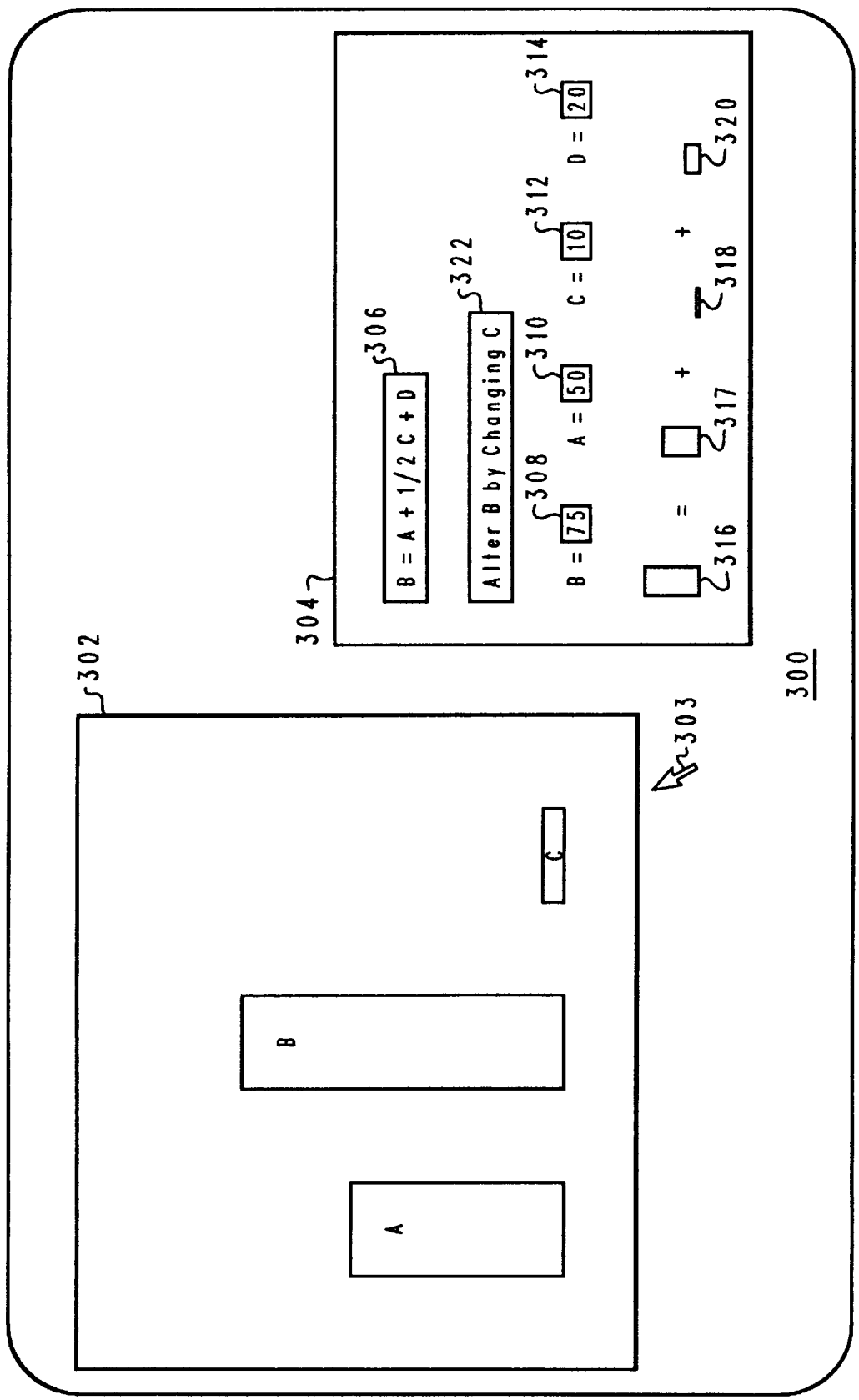
Figure 3F:
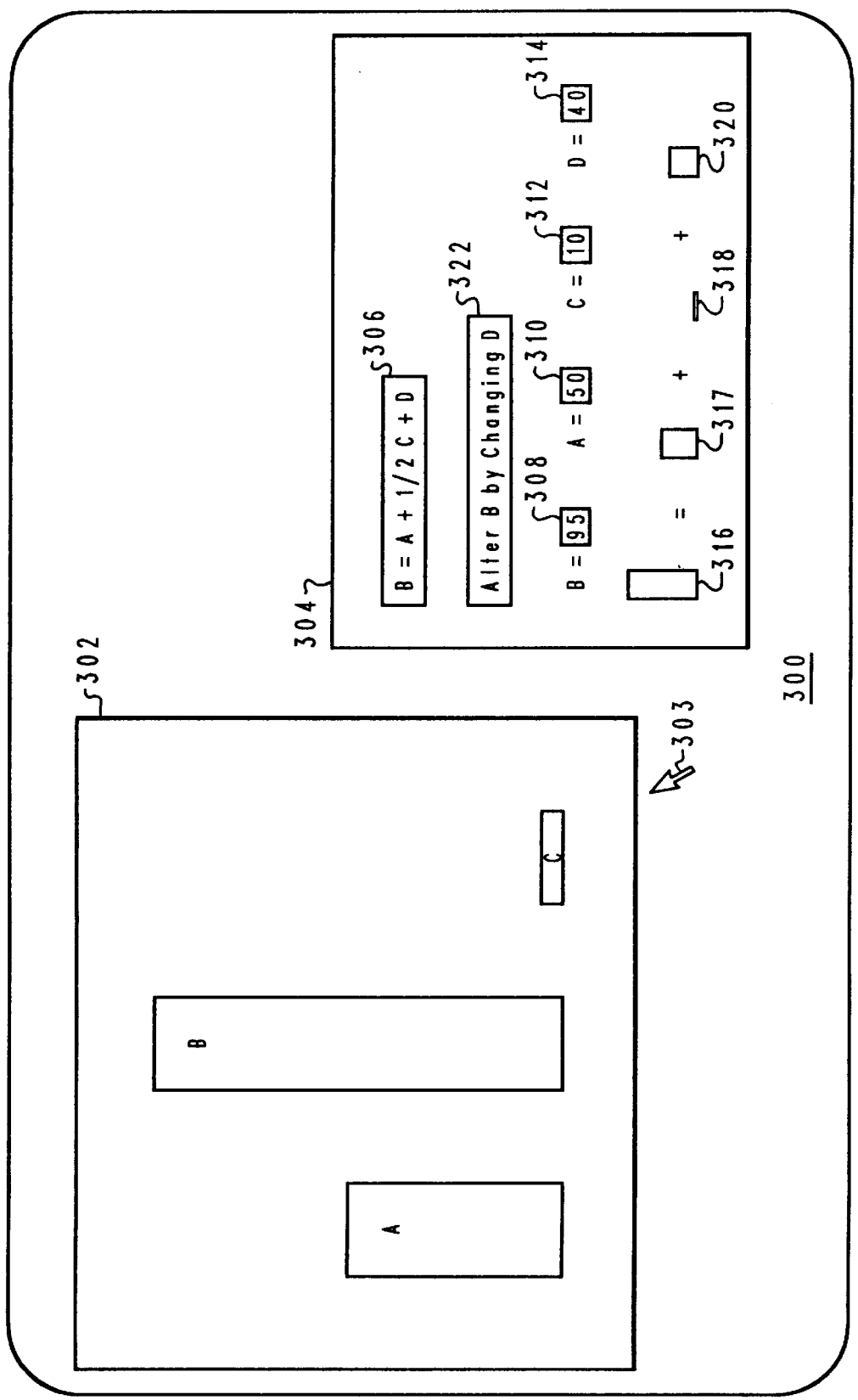
Figure 3C:
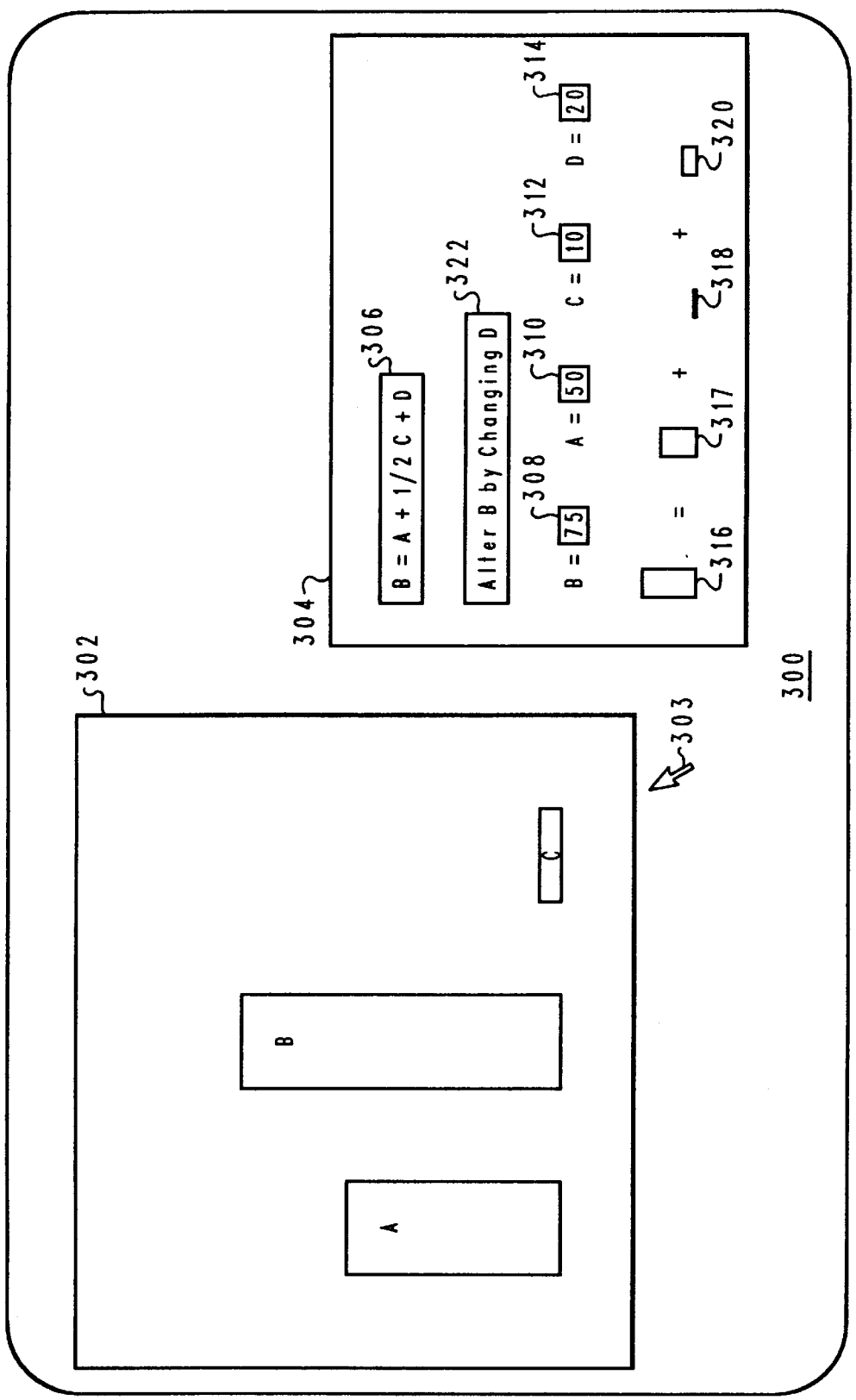

For example, if a user selects variable field 308 or bar 316, the value for variable B may be changed from 95 to 75 as depicted in FIG. 3E. Changing variable B also results in variable C being changed in the depicted example. These changes are reflected in variable field 312 and in bar 318. In addition, these changes are reflected in bars B and C in the graph displayed in window 302. Furthermore, variables having values stored in other data structures, such as, for example, a spread sheet or word processing document may be associated with or linked to the graph in window 302 and changed in response to user input to edit window 304. In FIG. 3F, text field 322 indicates that B may be altered by changing D. As a result, if the user selects bar 308 and decreases the value of variable B from 95 to 75, the value of variable D also decreases from 40 to 20 as reflected in variable field 314 and bar 320, as illustrated in FIG. 3G. The value for variable D is updated in the appropriate data structure.

As bar 316 is moved, the value of variable D, needed to maintain the integrity of the equation in field 306, is recalculated and bars 316 and 320 are redrawn to display the appropriate values. Variable fields 308 and 314 also are updated to display the appropriate value. If the integrity of the equation cannot be maintained, an error message may be displayed to the user or alternatively, the user may be prevented from altering bar 316 beyond valid values. In addition, a user also may change the variable that is to be altered to maintain integrity of the equation by selecting a new variable from the equation or utilizing alternate mechanisms, such as a list of variables or buttons representing variables that may be altered.

Figure 4:
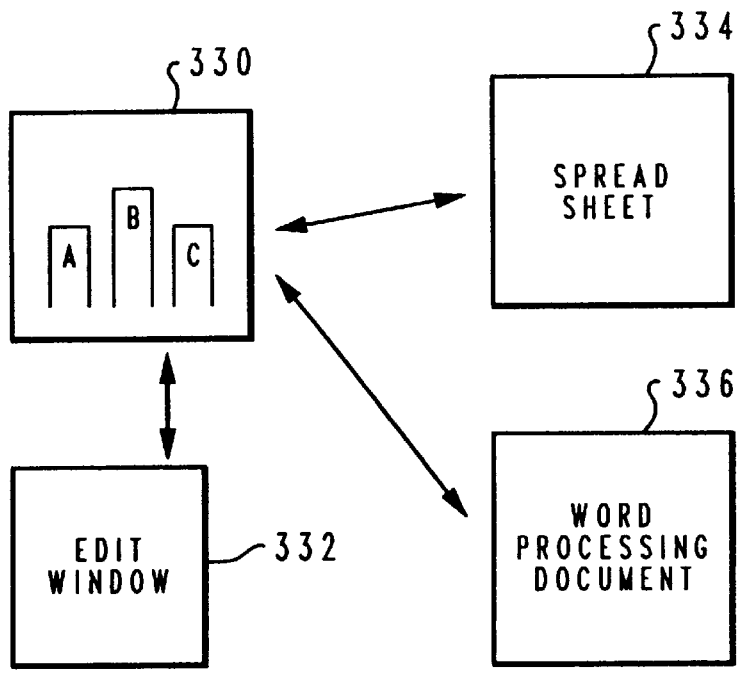
FIG. 4 is a block diagram illustrating the updating of data structures in accordance with a preferred embodiment of the present invention.

With reference now to FIG. 4, a block diagram of illustrating the updating of data structures is depicted in accordance with a preferred embodiment of the present invention. Graph 330 is displayed within window 302 as bars A, B, and C and may be edited by user input via edit window 332. In the example depicted in FIGS. 3A–3F, values for variables A, B, and C are stored in spread sheet 334 while values for variable D are stored in word processing document 336. Changes to bar B in graph 330 result from changing values in variable B and at least one of the other variables A, C, or D, utilizing edit window 332. These changes are updated in spread sheet 334 or word processing document 336. These data structures are normally accessed by a spread sheet program or a word processor. For example, if variable B and variable D are changed, the new value for variable B is updated in spread sheet 334 and the new value for variable D is updated in word processing document 336.

Figure 5:
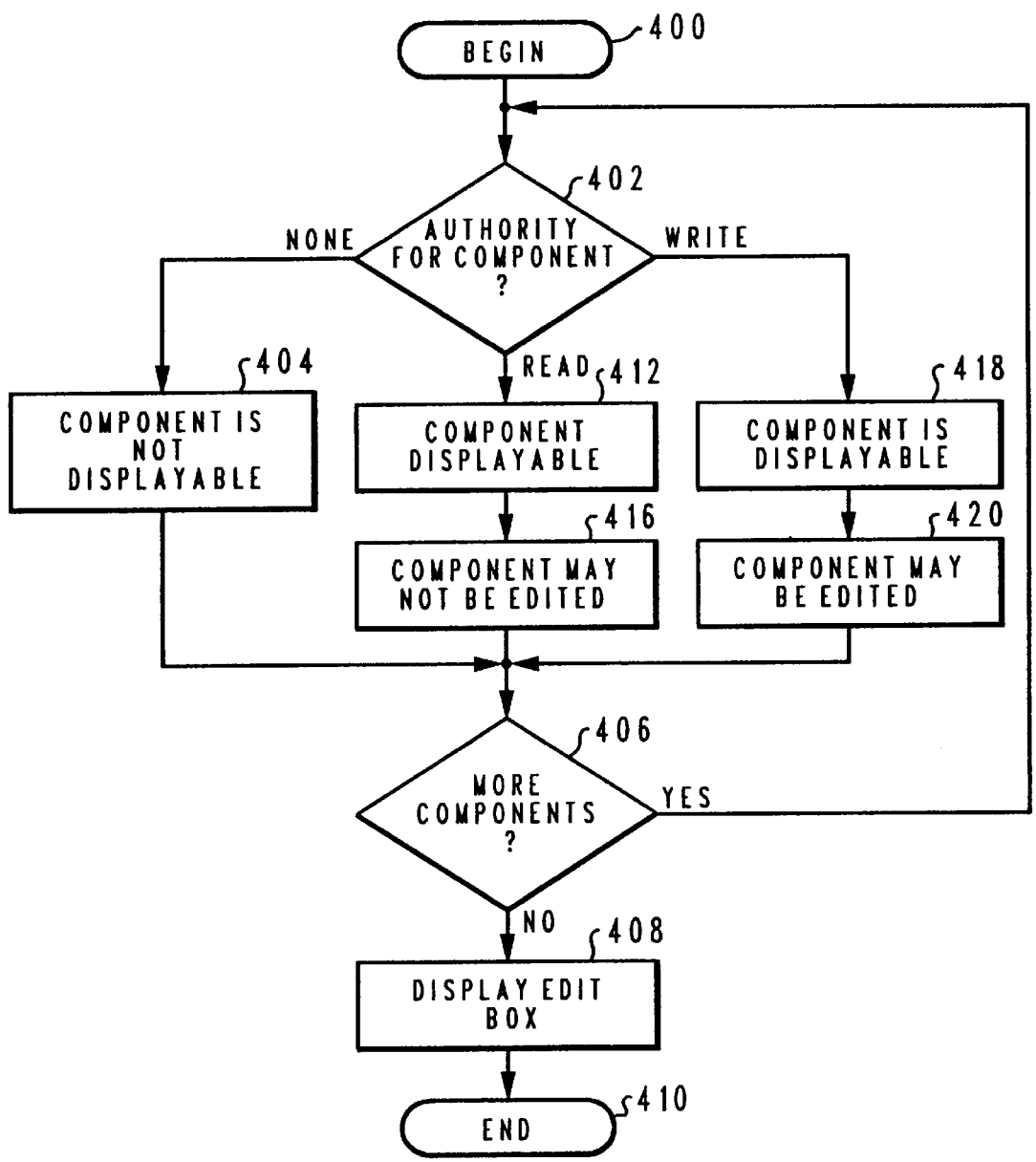
FIG. 5 depicts a flowchart of a process for selecting components for display within an edit window in accordance with a preferred embodiment of the present invention.

The processes depicted in FIGS. 5–11 may be implemented by those of ordinary skill in the art within the data processing system depicted in FIGS. 1 and 2. Referring first to FIG. 5, a flowchart of a process for selecting components for display within an edit window is depicted in accordance with a preferred embodiment of the present invention. Components define the graphic object. For example the variables A, B, C, and D in FIGS. 3A–3F are components that define bar B.

The process begins, as illustrated in block 400, and determines the authority that a particular user has for the component, as depicted in block 402. The authority also is referred to as the "user access level". If the authority or user access level is "none", the component is designated as not displayable in the graphic user interface, as illustrated in block 404. Thereafter, a determination is made as to whether more components are present, as depicted in block 406. If more components are not present, the edit box is displayed as illustrated in block 408 and the process terminates as depicted in block 410.

Referring again to block 406, if more components are present, the process returns to block 402 to determine the authority that a user has for the next component.

In block 402, if the authority is equal to "read", the component is designated as displayable, as illustrated in block 412. Next, the component is designated as not being editable by the user, as depicted in block 416. Referring back to block 402, if the user has a "write" authority, the component is designated as displayable by the process, as illustrated in block 418. Thereafter, the process also is designated as being editable by the user, as depicted in block 420.

Figure 6:
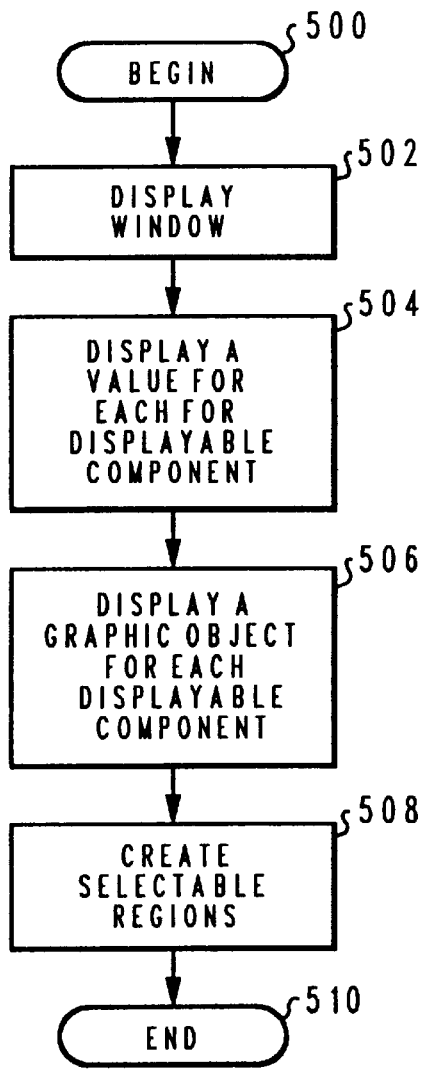
FIG. 6 is a flowchart of a process for displaying an edit window in accordance with a preferred embodiment of the present invention.

Referring next to FIG. 6, a flowchart of a process for displaying an edit window is depicted in accordance with a preferred embodiment of the present invention. The process begins, as illustrated in block 500, by displaying a window, as depicted in block 502. A value for each displayable component is displayed within the edit window by the process, as illustrated in block 504. In addition, a graphic object for each displayable component is displayed, as depicted in block 506. Selectable regions are created, as illustrated in block 508. These selectable regions are based on components designated as editable in FIG. 5. The process then terminates as depicted in block 510.

Figure 7:
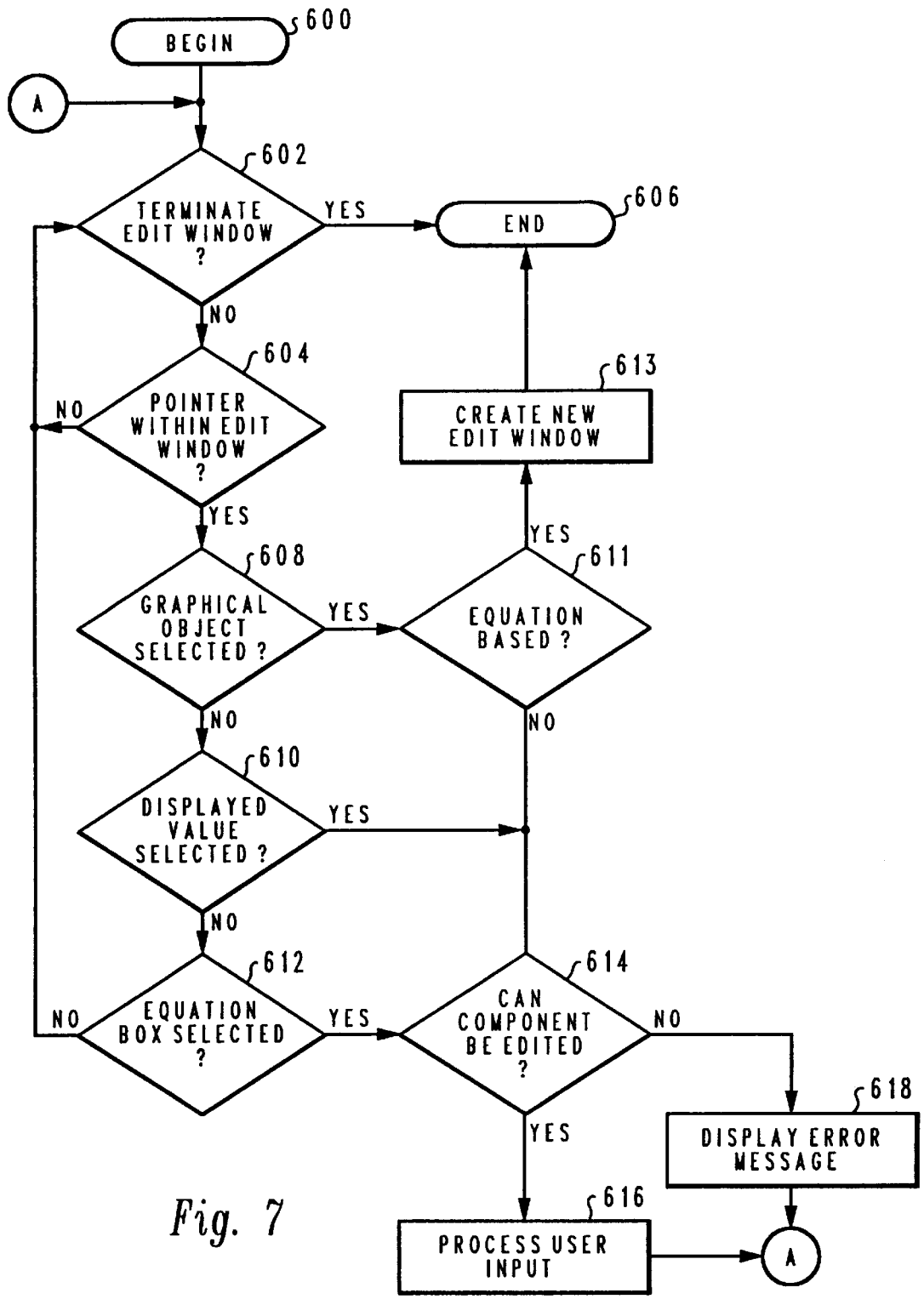
FIG. 7 depicts a flowchart of a process for handling a selection of regions within an edit window in accordance with a preferred embodiment of the present invention.

With reference now to FIG. 7, a flowchart of a process for handling a selection of regions within an edit window is illustrated in accordance with a preferred embodiment of the present invention. The process begins, as illustrated in block 600, and determines whether a selection has been made to terminate the edit window. Absent such a selection, the process then determines whether the pointer is within the edit window, as illustrated in block 604. If the pointer is not within the edit window, the process returns to block 602. A selection to terminate the edit window results in the process ending, as depicted in block 606.

Referring again to block 604, if the pointer is within the edit window, a determination is made as to whether a graphical object in the edit window has been selected as depicted in block 608. If a graphical object has not been selected, the process then determines whether a displayed value has been selected, as illustrated in block 610. Absent a selection of a displayed value, the process then determines whether an equation box has been selected, as depicted in block 612. If the answer to this determination is no, the process then returns to block 602.

If a displayed value or an equation has been selected, the process then determines whether the selected component can be edited, as depicted in block 612. If the selected component can be edited, the user input is processed, as illustrated in block 616. Thereafter, the process returns to block 602. Referring again to block 614, if the component cannot be edited, an error message is displayed to the user in accordance with a preferred embodiment of the present invention, as depicted in block 618.

If a graphical object in the edit window has been selected, a determination as to whether the graphic object is equation based is made, as illustrated in block 611. If the graphic object is not equation based, the process then proceeds to block 614 to determine whether the graphic object can be edited. If the graphic object can be edited, the user input is processed, as illustrated in block 616. Thereafter, the process returns to block 602. Referring again to block 614, if the component can not be edited, an error message is displayed to the user, as depicted in block 618. Referring again to block 611, if the graphic object is equation based, a new edit window is created, as illustrated in block 613. An equation based graphical object is a graphical object that is represented by an equation instead of a value. A new edit window may be created utilizing the processes depicted in FIGS. 5 and 6 in accordance with a preferred embodiment of the present invention. Thereafter, the process terminates, as illustrated in block 606.

Figure 8:
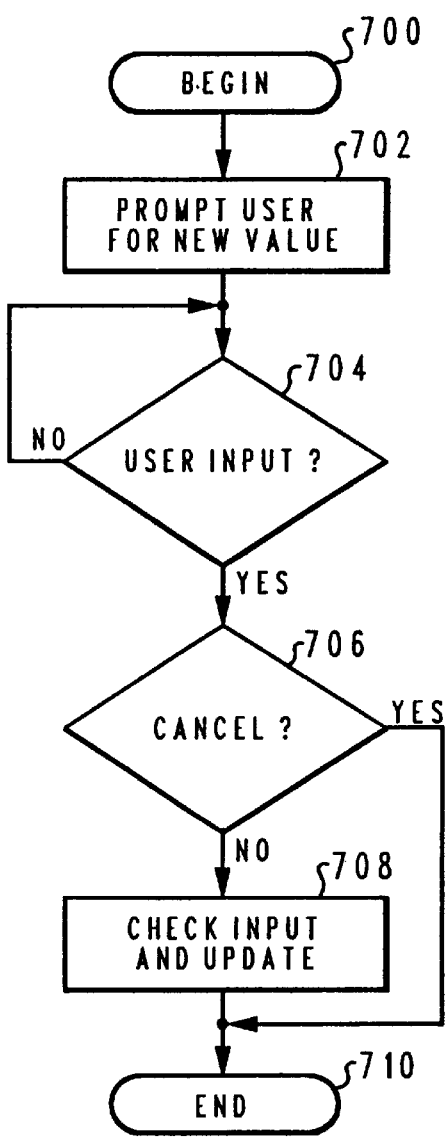
FIG. 8 depicts a flowchart of a process for handling a selection of a value field in accordance with a preferred embodiment of the present invention.

Referring now to FIG. 8, a flowchart of a process for handling user input in block 616 in response to a selection of a value field is illustrated in accordance with a preferred embodiment of the present invention. The process begins, as illustrated, in block 700, and thereafter, the user is prompted for a new value, as depicted in block 702. The prompt may take the form of a message or some visual cue, such as, for example, placing a cursor in the selected field or causing the present value in the value field to blink. Thereafter, the process determines whether user input has occurred as illustrated in block 704. When user input occurs, a determination is made as to whether the user input is to cancel the selection of the value field, as depicted in block 706. If the answer is no, the process then checks the input and updates the edit window and the window containing the graph, as illustrated in block 708. In addition, any data structures associated or linked to the graph also are updated in accordance with a preferred embodiment of the present invention. Thereafter, the process terminates, as depicted in block 710. Referring again to block 706, if cancel has been entered by the user, the process also terminates, as depicted in block 710.

Figure 9:
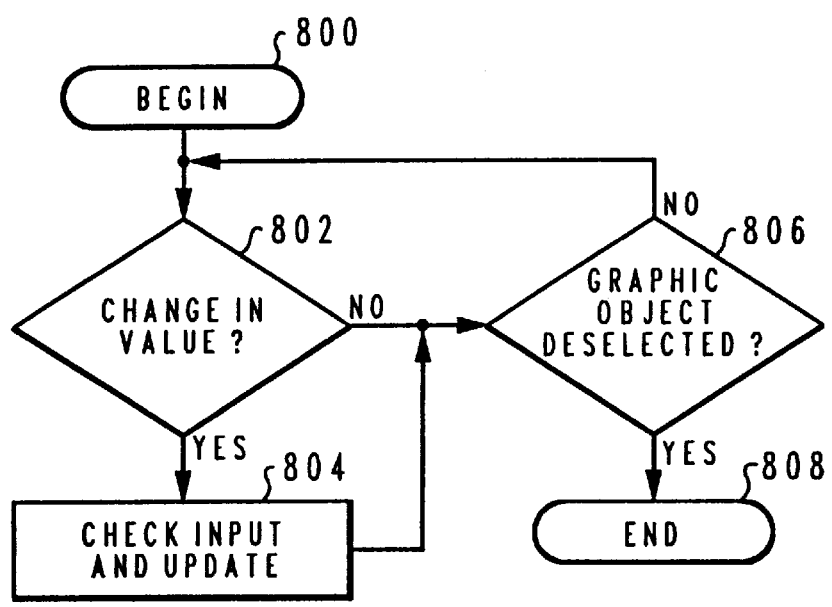
FIG. 9 depicts a flowchart of a process for handling a selection of a graphic object in an edit window in accordance with a preferred embodiment of the present invention.

Referring now to FIG. 9, a flowchart of a process for handling user input in block 616 in FIG. 7 in response to a selection of a graphic object in an edit window is illustrated in accordance with a preferred embodiment of the present invention. The process begins, as depicted in block 800, and thereafter a determination is made as to whether a change in value has occurred, as depicted in block 802. If a change in value has occurred, the process checks the input and updates the necessary data structures, graphs and windows as illustrated in block 804. Thereafter, a determination is made as to whether the graphic object has been deselected, as depicted in block 806. If the graphic object has been deselected, the process terminates as illustrated in block 808. Referring again to block 806, if the graphic object has not been deselected, the process returns to block 802.

If a change in value has not occurred, the process determines whether the graphic object has been deselected, as depicted in block 806. If the graphic object has not been deselected, the process returns to block 802. Otherwise, the process terminates as illustrated in block 808.

Figure 10:
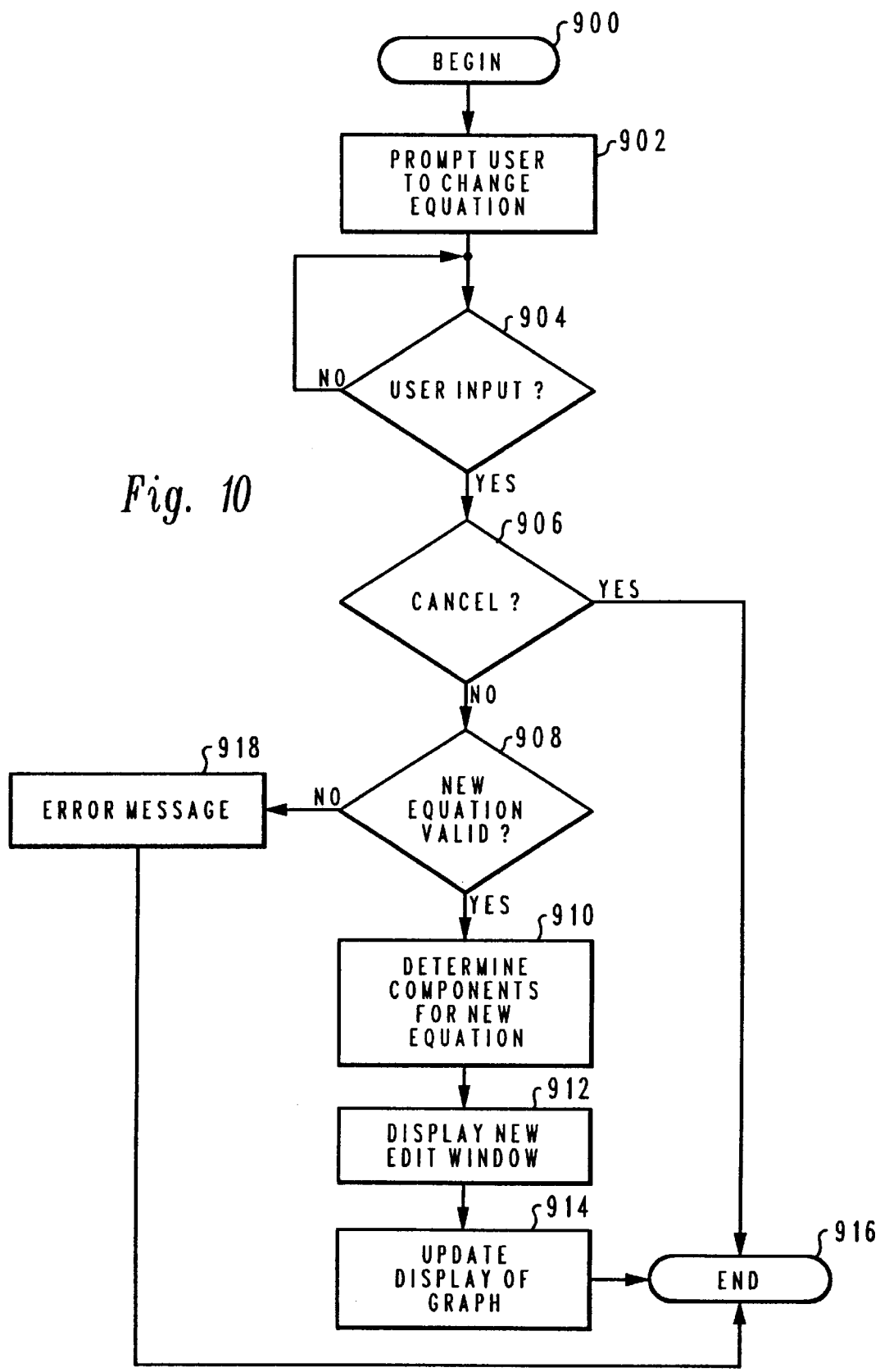
FIG. 10 is a flowchart of a process for handling a selection of an equation in an edit window in accordance with a preferred embodiments of the present invention.

Referring now to FIG. 10, a flowchart of a process for handling user input in block 616 in FIG. 7 in response to a selection of an equation box in an edit window is illustrated in accordance with a preferred embodiment of the present invention. The process begins, as illustrated in block 900, and thereafter prompts the user to change the equation, as depicted in block 902. Thereafter, a determination of whether user input has occurred is made, as illustrated in block 904. The process continues to return to block 904 until user input occurs.

The presence of user input results in a determination of whether the user input is to cancel the process, as depicted in block 906. If the answer is no, the process then determines whether the new equation is valid, as illustrated in block 908. If the equation is valid, then components are determined for the new equation, as depicted in block 910. Thereafter, a new edit window is displayed utilizing the components for the new equation, as illustrated in block 912. The display of the graph is updated, as depicted in block 914 with the process then terminating, as illustrated in block 916.

Referring again to block 908, if the new equation is not valid, an error message is displayed to the user, as depicted in block 918. Thereafter, the process again terminates, as illustrated in block 916. Referring again to block 906, if the user input is to cancel the process, then the process terminates as illustrated in block 916.

Figure 11:
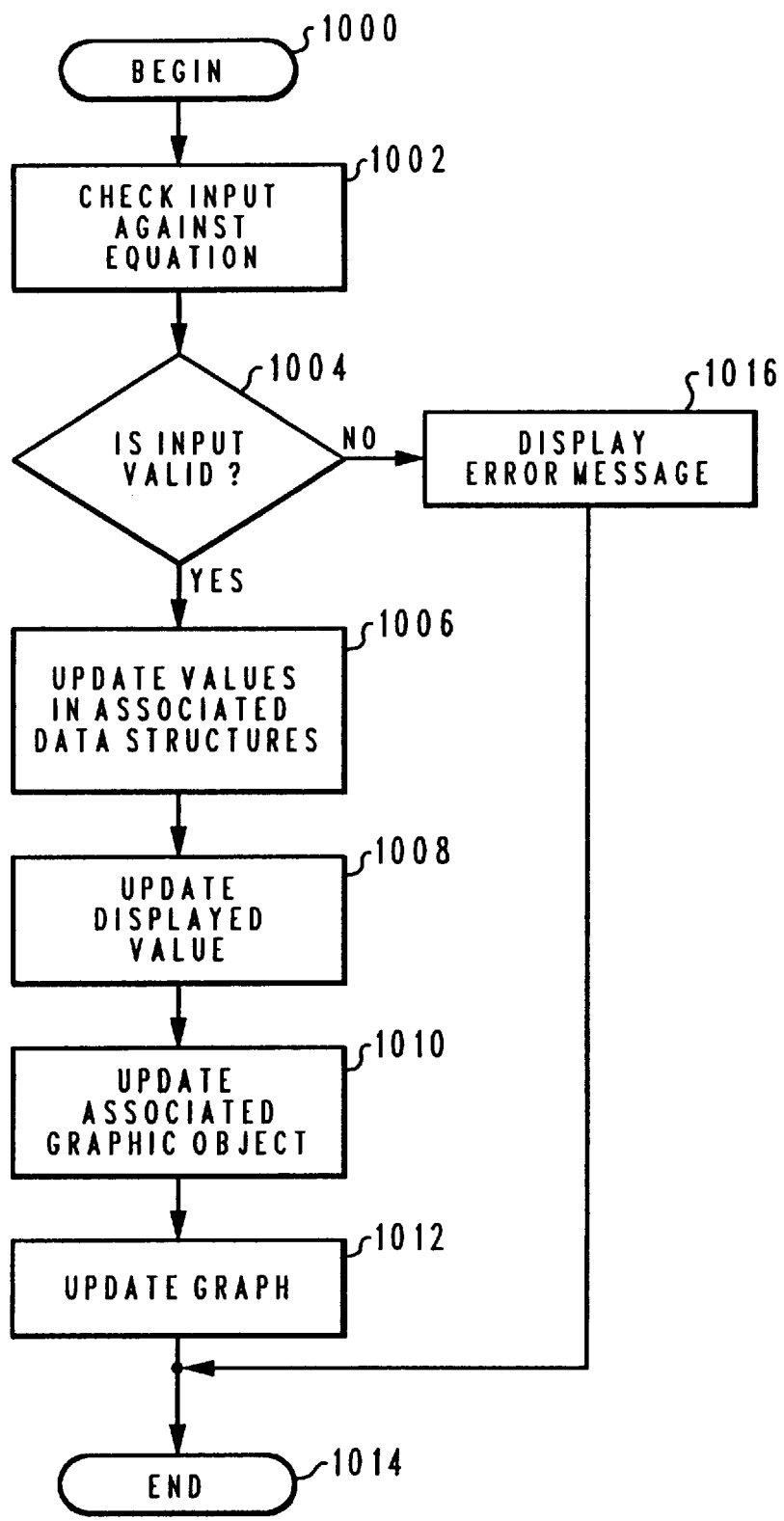
FIG. 11 depicts a flowchart of a process to check input and update windows and data structures in accordance with a preferred embodiment of a present invention.

Referring now to FIG. 11, a flowchart of a process to check input and update windows and data structures in block 708 in FIG. 8 and in block 804 in FIG. 9 is depicted in accordance with a preferred embodiment of the present invention. The process begins, as illustrated in block 1000 and thereafter the user input is checked against the equation for the graph, as depicted in block 1002. Thereafter, a determination of whether the input is valid is made, as illustrated in block 1004. If the user input is valid, the values in associated or linked data structures are updated, as depicted in block 1006. Next, the displayed value is updated, as illustrated in block 1008. In addition, the graphic object associated with the displayed value also is updated, as depicted in block 1010. Thereafter, the graph is updated, as illustrated in block 1012. Thereafter, the process terminates, as depicted in block 1014.

Referring again to block 1004, if the user input is invalid, the process displays an error message, as illustrated in block 1016. Thereafter, the process terminates, as depicted in block 1014.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for efficiently manipulating a graphic object displayed within a graphic user interface in said data processing system, said graphic object being defined by a plurality of interrelated variables, said method comprising:

displaying an editing object within said graphic user interface in response to a selection of said graphic object by a user;

permitting said user to alter a value for one of said plurality of interrelated variables utilizing said editing object;

automatically altering a value for at least one other variable in response to said user altering said value for one of said plurality of interrelated variables utilizing said editing object; and automatically altering a display of said graphic object in response to an alteration of said value for said at least one other variable, wherein said graphic object is efficiently manipulated.

2. The method of claim 1, wherein said plurality of interrelated variables defining said graphic object are associated with at least one data structure, said at least one data structure including a value for each said plurality of interrelated variables and further comprising automatically updating said at least one data structure in response to said alteration of said value for at least one other variable.

3. The method of claim 1 further comprising determining an access level for said graphic object with respect to said user in response to said selection of said graphic object by said user.

4. The method of claim 3, wherein said step of permitting said user to alter a value for one of said plurality of interrelated variables utilizing said editing object comprises permitting said user to alter a value for one of the said plurality of interrelated variables only if said access level for said user is a write authority.

5. The method of claim 1, wherein said step of displaying an editing object within said graphic user interface in response to a selection of said graphic object by a user comprises displaying an edit window within said graphic user interface in response to a selection of said graphic object by said user.

6. A method in a data processing system for efficiently manipulating a graphic object displayed within a graphic user interface in said data processing system, said graphic object being defined by a plurality of interrelated variables, said method comprising:

associating said plurality of interrelated variables defining said graphic object with at least one data structure, said at least one data structure including a value for each said plurality of interrelated variables;

displaying an editing object within said graphic user interface in response to a selection of said graphic object by a user;

permitting said user to alter a value for one of said plurality of interrelated variables utilizing said editing object;

automatically altering a value for at least one other variable in response to said user altering said value for one of said plurality of interrelated variables utilizing said editing object;

automatically altering a display of said graphic object in response to an alteration of said value for said at least one other variable; and automatically updating said at least one data structure in response to said alteration of said value for at least one other variable, wherein said graphic object may be efficiently manipulated.

7. The method of claim 6 further comprising determining an access level for said graphic object with respect to said user in response to said selection of said graphic object by said user.

8. The method of claim 7, wherein said step of permitting said user to alter a value for one of said plurality of interrelated variables utilizing said editing object comprises permitting said user to alter a value for one of the said plurality of interrelated variables only if said access level for said user is a write authority.

9. The method of claim 6, wherein said step of displaying an editing object within said graphic user interface in response to a selection of said graphic object by a user comprises displaying an edit window within said graphic user interface in response to a selection of said graphic object by said user.

10. A data processing system for efficiently manipulating a graphic object displayed within a graphic user interface in said data processing system, said graphic object being defined by a plurality of interrelated variables, said data processing system comprising:

display means for displaying an editing object within said graphic user interface in response to a selection of said graphic object by a user;

means for permitting said user to alter a value for one of said plurality of interrelated variables utilizing said editing object;

first alteration means for automatically altering a value for at least one other variable in response to said user altering said value for one of said plurality of interrelated variables utilizing said editing object; and second alteration means for automatically altering a display of said graphic object in response to an alteration of said value for said at least one other variable, wherein said graphic object is efficiently manipulated.

11. The data processing system of claim 10, wherein said plurality of interrelated variables defining said graphic object are associated with at least one data structure, said at least one data structure including a value for each said plurality of interrelated variables and further comprising updating means for automatically updating said at least one data structure in response to said alteration of said value for said at least one other variable.

12. The data processing system of claim 10 further comprising means for determining an access level for said graphic object with respect to said user in response to said selection of said graphic object by said user.

13. The data processing system of claim 12, wherein said means for permitting said user to alter a value comprises means for permitting said user to alter a value for one of the said plurality of interrelated variables only if said access level for said user is a write authority.

14. The data processing system of claim 10, wherein said display means comprises displaying an edit window within said graphic user interface in response to a selection of said graphic object by said user.

15. The data processing system of claim 10, wherein said graphic object is selected by a pointer.

16. A program storage device readable by a data processing system and encoding data processing system executable instructions operable within a graphic user interface comprising:

first instruction means for displaying an editing object within said graphic user interface in response to a selection of said graphic object by a user;

second instruction means for permitting said user to alter a value for one of a plurality of interrelated variables utilizing said editing object;

third instruction means for automatically altering a value for at least one other variable in response to said user altering said value for one of said plurality of interrelated variables utilizing said editing object; and fourth instruction means for automatically altering a display of said graphic object in response to said alteration of said value for said at least one other variable.

17. A computer comprising:

a graphic user interface;

a storage means for storing data;

a graphic object displayed within said graphic user interface, wherein said graphic object is defined by a plurality of interrelated variables stored within said storage means;

a processor coupled to said storage means, wherein said processor includes:

first processor means for displaying an editing object within said graphic user interface in response to a selection of said graphic object by a user;

second processor means for permitting said user to alter a value for one of said plurality of interrelated variables utilizing said editing object;

third processor means for automatically altering a value for at least one other variable in response to said user altering said value for one of said plurality of interrelated variables utilizing said editing object; and fourth processor means for automatically altering a display of said graphic object in response to an alteration of said value for said at least one other variable.

18. The computer of claim 17, wherein said storage means includes a memory.

19. The computer of claim 17, wherein said storage means further includes a hard disk drive.

20. The computer of claim 19, wherein said plurality of interrelated variables defining said graphic object are associated with at least one data structure, said at least one data structure including a value for each said plurality of interrelated variables and said processor further includes sixth processor means for automatically updating said at least one data structure in response to said alteration of said value for said at least one other variable.

\* \* \* \* \*